No. 757,526. PATENTED APR. 19, 1904.
R. VARLEY.
LOCK NUT.
APPLICATION FILED JAN. 12, 1904.
NO MODEL.

Witnesses
Inventor
Richard Varley
By his Attorney

No. 757,526.  
Patented April 19, 1904.

UNITED STATES PATENT OFFICE.

RICHARD VARLEY, OF PROVIDENCE, RHODE ISLAND, ASSIGNOR TO VARLEY DUPLEX MAGNET COMPANY, A CORPORATION OF NEW JERSEY.

LOCK-NUT.

SPECIFICATION forming part of Letters Patent No. 757,526, dated April 19, 1904.

Application filed January 12, 1904. Serial No. 188,696. (No model.)

*To all whom it may concern:*

Be it known that I, RICHARD VARLEY, a citizen of the United States, residing at Providence, in the county of Providence and State of Rhode Island, have invented certain new and useful Improvements in Lock-Nuts, of which the following is a full, clear, and exact description.

This invention relates to lock-nuts, the object being to provide an efficient device of this character; and the invention consists, essentially, of a nut having a concentric plate of the same peripheral shape as the nut and axially pivoted thereto to rotate with respect to the nut through a fraction of a rotation, in combination with a locking-plate having an opening therein of the shape of the exterior of the nut and adapted to fit over the latter to prevent the nut from turning and to be retained in position by the said rotary plate, the locking-plate being itself secured by engagement with a fixed pin.

The description in detail follows, with reference to the accompanying drawings, in which—

Figure 1:
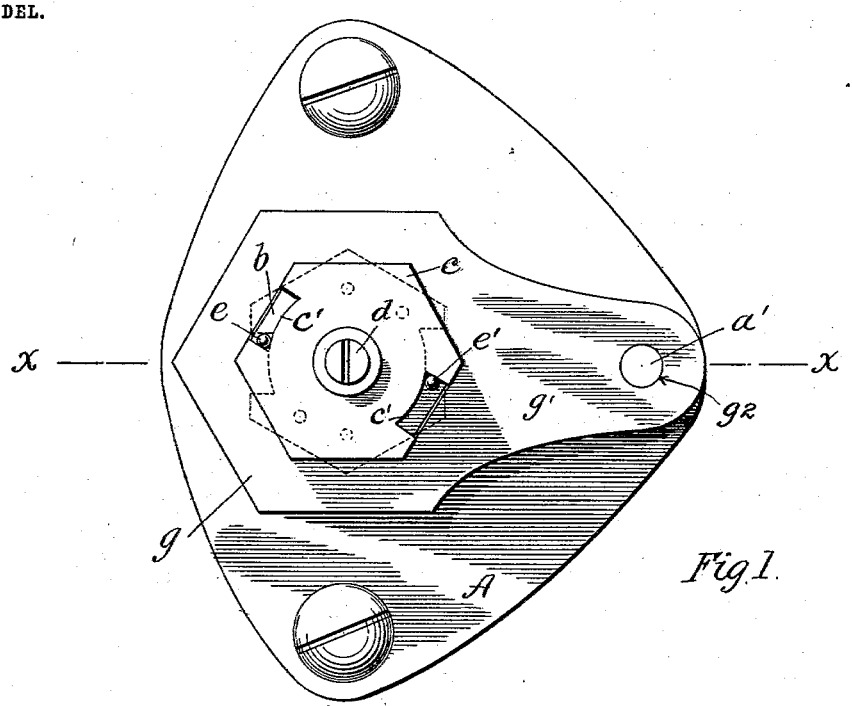
Figure 2:
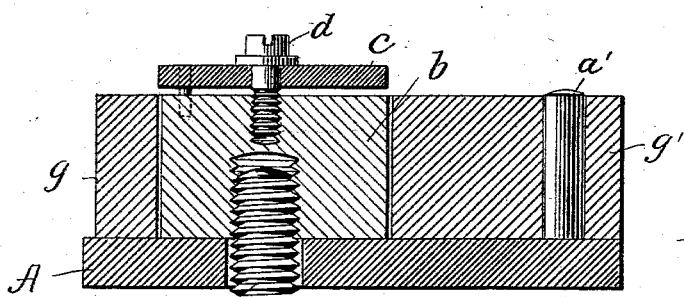
Figure 3:
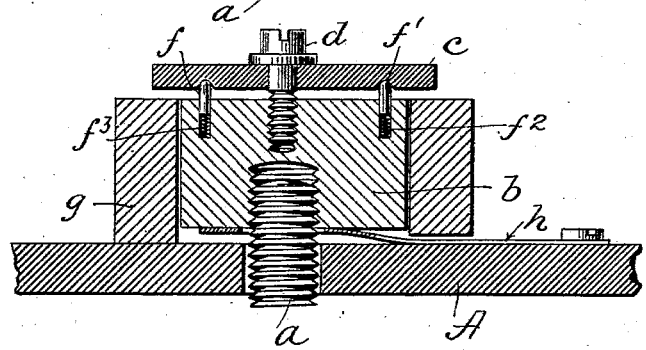

Figure 1 is a plan of the nut-lock. Fig. 2 is a section on line $x$ $x$ of Fig. 1, and Fig. 3 is a section taken at right angles to the view shown in Fig. 2 and also illustrating a modification.

A indicates a base or other part through which the bolt $a$ projects. This bolt is to be drawn through the base by a nut $b$, having the usual threaded axial hole, the hole in this case not extending entirely through the nut. To the upper side of the nut is attached concentrically a retaining-plate $c$, the mode of attachment being by means of a center screw $d$. The periphery of this plate is of the same shape and diameter as that of the nut—that is to say, if the nut is hexagonal the plate is also hexagonal and of the same diameter at corresponding locations. The plate is applied to the nut in the following manner: The screw is first passed loosely through a hole in plate $c$ and enters a threaded axial hole in the top of the nut. When the screw has passed into the threaded hole to the full extent, it is slacked back slightly and the plate turned to bring its flat sides or edges into the same planes, respectively, with those of the nut. Then the screw is soldered or otherwise secured to the plate, so that the plate and screw will thereafter turn together. At diametrically opposite points the plate is provided with notches $c'$ or slots extending concentrically over a fraction of the circumference of the plate. The nut carries two pins $e$ and $e'$, respectively, which project upward into these notches and serve to limit the rotary motion of the plate with respect to the nut in such a manner that by turning the plate until the pins are at one end of the notches or slots the corners of the plate will stand across or beyond the flat sides of the nut, while by turning the plate to the opposite position its corners and sides will occupy the same planes, respectively, as those of the nut. In the top of the nut there are also two other pins $f$ and $f'$, which rest loosely in cavities $f^2$ upon springs $f^3$, contained therein, the spring tending to force the pin upward against the under side of the plate $c$. The plate is provided with two sockets for each pin, which are so located that when the plate is at the limit of either of its positions it will there be held against reverse movement by the pins engaging with their corresponding sockets.

$g$ is a locking-plate which is provided with an opening of the same shape as the nut and adapted to pass freely over the nut and rest upon the base A. This locking-plate is provided with a tailpiece $g'$, having a hole $g^2$, and the base-plate A is provided with a pin $a'$, adapted to enter said hole.

To apply and lock the nut, the procedure is as follows: First the nut is screwed over the bolt $a$ until the proper degree of security is obtained. Then the plate $c$ is adjusted, if necessary, to bring its sides into the same plane with those of the nut. Then the locking-plate $g$ is presented to the nut with its tailpiece $g'$ in a position to aline its opening $g^2$ with the pin $a'$, if possible. If the position of the nut when tight will not permit the opening $g^2$ to pass over the pin $a'$, the nut is set back a fraction of a rotation to allow said opening to line up with the pin. Then the plate $g$ is passed fully over the nut and the pin $a'$ to occupy the position shown in Fig. 2. The locking-plate thus prevents further rotation of the nut. It now becomes necessary to retain the locking-plate in position, notwithstanding any jarring or rough usage to which the nut may be subjected. This is done by giving the plate $g$ a partial rotation to bring its corners across or beyond the sides of the nut, so that they will overlap the locking-plate $g$. Since the plate $e$ is firmly secured to the nut, the locking-plate cannot become detached therefrom. When the plate $c$ is thus adjusted, the spring-pins $f$ and $f'$ prevent the return of the plate $c$ to a position where the locking-plate would be released.

I intend using this lock-nut on an electrical apparatus wherein the necessity of having the nut absolutely tight against the base A is not so great as to have a good electrical connection between the nut and base. For this reason any slacking of the nut that may be necessary to bring the hole in the locking-plate into line with the pin $a'$ is not material so long as it does not vitiate the electrical connection before mentioned, and to prevent this for my own purposes I propose to place a perforated spring-plate $h$ between the nut and the base A, said plate being passed over the bolt $a$ and secured to the base A. Thus when the nut is slacked back, if the same is necessary, the electrical connection between the nut and the base A is maintained through the spring. Fig. 3 shows the nut slacked back, but considerably exaggerated for the purposes of illustration.

The operation of removing the nut is very simple. First the plate $c$ is returned to its original position, then the locking-plate $g$ is withdrawn, after which a wrench can be applied to the nut.

Having described my invention, I claim—

1. The combination of a nut, a locking-plate fitting over the same, means for preventing the turning of said plate and a retaining-plate axially pivoted to the top of the nut and adapted to be turned to overlap the locking-plate.

2. The combination of a nut, a locking-plate consisting of a body having an opening adapted to fit over the nut and a tailpiece having an opening therein, a fixed pin adapted to engage the opening of the tailpiece, and a retaining-plate rotatably attached to the top of the nut and adapted to overlap the locking-plate.

3. The combination of a polygonal nut, a locking-plate having an opening adapted to fit over said nut, a polygonal plate of the same shape and diameter as the nut and rotatably attached to the top of the nut, whereby the rotation of the plate to a certain position will cause the latter to overlap the locking-plate.

4. The combination of a polygonal nut, a locking-plate adapted to fit over the same, a polygonal plate rotatably attached to the top of the nut, openings in said plate and pins carried by the nut and projecting into the openings to determine the limits of rotation of the plate, for the purpose set forth.

In witness whereof I subscribe my signature in presence of two witnesses.

RICHARD VARLEY.

Witnesses:
   MAMIE M. CROSWELL,
   WILLETT CHADWICK.